(12) United States Patent
Tashiro et al.

(10) Patent No.: US 6,667,138 B2
(45) Date of Patent: Dec. 23, 2003

(54) IMAGE FORMING METHOD USING SILVER HALIDE COLOR PHOTOGRAPHIC LIGHT-SENSITIVE MATERIAL AND IMAGE FORMING APPARATUS THEREFORE

(75) Inventors: Kouji Tashiro, Hino (JP); Hiroaki Takano, Hino (JP)

(73) Assignee: Konica Corporation (JP)

( * ) Notice: Subject to any disclaimer, the term of this patent is extended or adjusted under 35 U.S.C. 154(b) by 0 days.

(21) Appl. No.: 10/227,890

(22) Filed: Aug. 26, 2002

(65) Prior Publication Data

US 2003/0129507 A1 Jul. 10, 2003

(30) Foreign Application Priority Data

Sep. 4, 2001 (JP) ......................................... 2001-266744

(51) Int. Cl.[7] .............................. G03C 5/08; G03C 7/32; G03C 11/00
(52) U.S. Cl. .......................................... 430/21; 430/364
(58) Field of Search ........................... 430/21, 363, 364

(56) References Cited

U.S. PATENT DOCUMENTS

| | | | | |
|---|---|---|---|---|
| 5,155,596 A | * | 10/1992 | Kurtz ........................... 358/214 |
| 5,858,629 A | * | 1/1999 | Ishikawa et al. ............. 430/380 |
| 6,069,714 A | * | 5/2000 | Edgar ........................... 358/471 |
| 6,225,018 B1 | * | 5/2001 | Haraga ......................... 430/139 |
| 6,521,384 B2 | * | 2/2003 | Szajewski ..................... 430/21 |

FOREIGN PATENT DOCUMENTS

| | | |
|---|---|---|
| JP | 06-28468 | 2/1994 |
| JP | 09-146247 | 6/1997 |
| JP | 2000-310840 | 11/2000 |
| JP | 2001-078038 | 3/2001 |

* cited by examiner

Primary Examiner—Richard L. Schilling
(74) Attorney, Agent, or Firm—Cantor Colburn LLP

(57) ABSTRACT

An image information recording method, comprising the steps of: (a) imagewise exposing to light a silver halide color photographic light-sensitive material comprising a support having thereon a light-sensitive layer containing a silver halide and a color coupler; (b) subjecting the photographic light-sensitive material to color development so as to obtain an image in the photographic light-sensitive material; (c) converting the image in the photographic light-sensitive material to electric image information using a scanner comprising a light source part and a light receiving part while at least 80% of the developed silver and the silver halide remains in the photographic light-sensitive material; and (d) recording the electric information on a recording medium, wherein, the step (c) is carried out with the scanner that exhibits a light diffusion coefficient of at least 0.8.

7 Claims, 1 Drawing Sheet

IMAGE FORMING METHOD USING SILVER HALIDE COLOR PHOTOGRAPHIC LIGHT-SENSITIVE MATERIAL AND IMAGE FORMING APPARATUS THEREFORE

FIELD OF THE INVENTION

This invention relates to an image forming method using a silver halide photographic light-sensitive material and an apparatus therefore, further relates in detail to a suitable digital image forming method and an apparatus therefore according to a silver halide photographic light-sensitive material by a simple processing.

BACKGROUND OF THE INVENTION

At present, a high quality color image can be easily obtained in accordance with the increasingly progressed silver halide photographic light-sensitive material. For instance, an object is photographed by a color negative film and a color print is obtained by optically printing image information recorded on the developed color negative film to a color photographic paper, such process is usually called as a conventional color photography. The process is highly developed so that anyone can enjoy the color photography according to the spreading of a color-lab as a large scale centralizing point for mass-producing of color print with a high efficiency or a large and simple printer-processor installed in a store so called mini-lab.

The color reproduction by a subtractive color system is utilized as a principle in the usual color photography at the present time. In a usual color negative film, light-sensitive materials comprising a plurality of silver halide emulsion layers each having light-sensitivity to blue, green and red region, respectively, as a light-sensitive element are provided on a transparent support. In each of the light-sensitive layers, a color coupler forming yellow, magenta or cyan dye each complimentary color of blue, green or red is contained.

The color negative film imagewise exposed to light by photographing is developed by a color developer containing an aromatic primary amine developing agent. At the development, the light-exposed silver halide grain is developed or reduced by the developing agent and each of the dyes is formed by coupling reaction of the color forming coupler and an oxidation product of the developing agent formed by the developing reaction. Then metallic silver formed by the development, hereinafter referred to as developed silver, and the non-reacted silver halide are each removed by a bleaching and fixing processes to obtain a dye image.

A color print can be obtained by giving optical exposure through the processed color negative film to a color photographic paper having the same combination of the sensitive wavelength region and the formed color on a reflective support.

The demand for simplifying the processing is increasingly made strong according to the following reasons even though such system has been widely utilized.

Firstly, a special knowledge and a skilful operation are required since the composition and the temperature of the processing baths for color development, bleaching and fixing should be exactly controlled.

Secondarily, substances such as a color developing agent and an iron chelate compound as the bleaching agent, the evacuation of which are regulated for environmental preservation, are contained in these processing solutions. Therefore, specific equipment is frequently necessary for installation of the processing apparatus.

Thirdly, a long time is necessary to these processes even though the time is shortened by the recent technological development. The shortening of the processing time is insufficient yet for the requirement for the rapid processing.

On such background, a requirement to constitute a system without the use of the color developing agent and the bleaching agent usually used in the present color image forming system is increasingly made strong for reducing the pollutant load and simplifying the processes.

Besides, a system has been known in which the image formed on the color negative film is optically read by a scanner and converted to electric signals. The electric signals are subjected to an image processing to prepare digital image data, and the image information is transferred to an image recording medium using in the form of the digital image data. In this case, a print so called as a digital print can be obtained by scanning a light-sensitive material such as a color photographic paper. Moreover, the print can be by the non-silver salt printer such as an ink-jet printer, a sublimation printer or an electrophotographic printer.

Japanese Patent Publication Open to Public Inspection, hereinafter referred to as JP O.P.I. Publication, No. 9-146247 discloses a method by which an image formed on a film in which silver halide and developed silver are remained is read by the scanner to convert to electric signals. However, in this publication, a usual scanner available in the market is used for converting the image and detailed condition for reading the image, and any detailed condition for reading the image is not described. The quality of the image obtained by such method is quite insufficient for providing to a customer since the image quality is inferior to that of the image obtained by the negative through the usual desilverizing treatment even though the image can be read out by this method.

SUMMARY OF THE INVENTION

An object of the present invention is to provide an image forming method using a silver halide photographic light-sensitive material and an apparatus by which an image having almost the same quality as an image obtained by the usual or conventional method can be obtained even though the method is simplified.

The object of the invention can be attained by the following embodiments:

1. An image information recording method, comprising the steps of:
   (a) imagewise exposing to light a silver halide color photographic light-sensitive material comprising a support having thereon a light-sensitive layer containing a silver halide and a color coupler;
   (b) subjecting the photographic light-sensitive material to color development so as to obtain an image in the photographic light-sensitive material;
   (c) converting the image in the photographic light-sensitive material to electric image information using a scanner comprising a light source part and a light receiving part while at least 80% of the developed silver and the silver halide remains in the photographic light-sensitive material; and (d) recording the electric information on a recording medium, wherein, the step (c) is carried out with the scanner that exhibits a light diffusion coefficient of at least 0.8.

2. The image information recording method of item 1, wherein the step (c) is carried out with the scanner by adjusting an illuminance at the light receiving part to be in a range of 80,000 to 1,500,000 lux.

3. The image information recording method of item 1, wherein the light receiving part comprises a two-dimensional CCD.

4. The image information recording method of item 1, wherein the light-sensitive layer comprises a blue sensitive layer, a green sensitive layer and a red sensitive layer, and the light source part of the scanner for reading image information of the blue sensitive layer remits light having a spectrum exhibiting a wavelength of a center of gravity in the spectrum being longer than 460 nm, wherein the center of gravity in the spectrum, which is obtained plotting light intensity at the ordinate of the coordinate in terms of antilogarithm and wavelength at the abscissa of the coordinate in terms of antilogarithm, is a wavelength such that when the spectrum is divided into two, a longer wavelength part and a shorter wavelength part by a line through the wavelength parallel to the ordinate, the area in the shorter wavelength part and the area at the longer wavelength part are the same.

5. The image information recording method of item 4, wherein the overlapped area of the spectrum of the light source part for reading image information of the blue sensitive layer and the absorption spectrum of the image forming dye of the blue sensitive layer is at least 50% of the total area of the absorption spectrum of the image forming dye.

6. The image information recording method of item 4, wherein the overlapped area of the spectrum of the light source part for reading image information of the green sensitive layer and the absorption spectrum of the image forming dye of the green sensitive layer is at least 80% of the total area of the absorption spectrum of the image forming dye.

7. The image information recording method of item 4, wherein the overlapped area of the spectrum of the light source part for reading image information of the red sensitive layer and the absorption spectrum of the image forming dye of the red sensitive layer is at least 80% of the total area of the absorption spectrum of the image forming dye.

8. An image information recording apparatus, comprising:

(a) an exposure device for imagewise exposing to light a silver halide color photographic light-sensitive material comprising a support having thereon a light-sensitive layer containing a silver halide and a color coupler;

(b) a color development processing device for color developing the photographic light-sensitive material so as to obtain an image in the photographic light-sensitive material;

(c) a scanner comprising a light source part and a light receiving part for converting the image in the photographic light-sensitive material to electric image information while at least 80% of the developed silver and the silver halide remains in the photographic light-sensitive material; and (d) a recording devise for recording the electric information on a recording medium, wherein, the step (c) is carried out with the scanner that exhibits a light diffusion coefficient of at least 0.9, and the step (c) is carried out with the scanner by adjusting an illuminance at the light receiving part to be in a range of 80,000 to 1,500,000 lux.

9. An image information recording apparatus, comprising:

(a) an exposure device for imagewise exposing to light a silver halide color photographic light-sensitive material comprising a support having thereon a light-sensitive layer containing a silver halide and a color coupler;

(b) a color development processing device for color developing the photographic light-sensitive material so as to obtain an image in the photographic light-sensitive material;

(c) a scanner comprising a light source part and a light receiving part for converting the image in the photographic light-sensitive material to electric image information while at least 80% of the developed silver and the silver halide remains in the photographic light-sensitive material; and (d) a recording devise for recording the electric information on a recording medium, wherein the light-sensitive layer comprises a blue sensitive layer, a green sensitive layer and a red sensitive layer, and the light source part of the scanner for reading image information of the blue sensitive layer remits light having a spectrum exhibiting a wavelength of a center of gravity in the spectrum being longer than 460 nm, wherein the center of gravity in the spectrum, which is obtained plotting light intensity at the ordinate of the coordinate in terms of antilogarithm and wavelength at the abscissa of the coordinate in terms of antilogarithm, is a wavelength such that when the spectrum is divided into two, a longer wavelength part and a shorter wavelength part by a line through the wavelength parallel to the ordinate, the area in the shorter wavelength part and the area at the longer wavelength part are the same.

10. An image information recording apparatus of item 9, wherein the blue sensitive layer has a spectral sensitivity diagram, and an overlapped area of the spectrum of the light source part for reading image information of the blue sensitive layer and the spectral sensitivity diagram of the blue sensitive layer is at least 50% of the total area of the spectral sensitivity diagram.

11. An image information recording apparatus of item 9, wherein the green sensitive layer has a spectral sensitivity diagram, and an overlapped area of the spectrum of the light source part for reading image information of the green sensitive layer and the spectral sensitivity diagram of the green sensitive layer is at least 80% of the total area of the spectral sensitivity diagram.

12. An image information recording apparatus of item 9, wherein the red sensitive layer has a spectral sensitivity diagram, and an overlapped area of the spectrum of the light source part for reading image information of the red sensitive layer and the spectral sensitivity diagram is at least 80% of the total area of the spectral sensitivity diagram.

DETAILED DESCRIPTION OF THE INVENTION

The invention is described in detail below.

In the description of the invention, the state in which all or a part of silver halide, developed silver or colloidal silver (if it is used), is remained is a state in which the imagewise exposed color negative film of the bleaching and fixing process are not completely carried out or the processes are discontinued at the incomplete stage. Such state in the invention includes a state in which the silver halide and the colloidal silver are not completely removed and discoloring treatment is further done.

In the description of the invention, a conventional color negative film such as Centuria Series, produced by Konica Corporation, is included in the silver halide color photographic light-sensitive material, hereinafter also referred to as a negative film, photographic film, light-sensitive material or photographic material. In the invention, a color negative film designed so as to be suitable for reading by the scanner may be used, not designed for suiting to the condition of the print making work by projection exposure to the photographic paper using an analogue printer for a conventional film. An example of such film is disclosed in JP O.P.I. Publication No. 2000-310840 which has a light sensitive layer for recording the luminance information for extract the luminance information and the color information of the digital image, preferably further has an independent light-sensitive layer for recording the color information. A light-sensitive material containing a developing agent may be used.

In the invention, the light diffusion coefficient of the scanner is defined as follows.

When the illuminance at the surface where the film to be set is $S_0$ and that at a point far from the film setting position at a distance of 10 cm in the progression direction of the light is $S_1$, the light diffusion coefficient is defined as:

$$1-(S_1/S_0)$$

Figure 1:
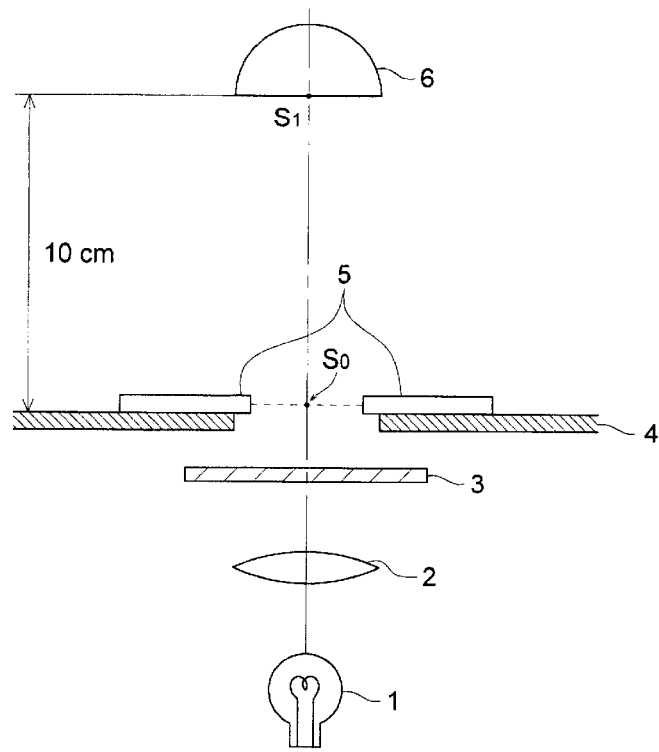
FIG. 1 is a schematic diagram for describing the measurement of a light diffusion coefficient.

The definition of $S_0$ and $S_1$ can be seen in FIG. 1.

Therefore, the diffusion coefficient is lowered when the light beam is controlled so as not to be diffused by the use of a condenser lens and no diffuser plate is used at the reading surface.

When a light source adjusted to the wavelength of the dye formed on the film using a LED, it is allowed that at least on of the blue-sensitive layer, green-sensitive layer and red-sensitive layer satisfy the foregoing condition.

It has been well known in the optical printing system that the contrast and granularity of the enlarged photo-print are largely varied depending on the method for illuminating the negative film, which is described as follows.

The method for illuminating the negative film in the enlarger is roughly classified into three types such as a condensed type by which the negative image is illuminated by parallel light, a diffuser type using diffused light for illumination and a condensed-diffuser type that is classified between the condensed type and the diffuser type.

In the case of a black-and-white negative film, the contrast of the enlarged printed image is varied depending on the type of light for illuminating the negative in the enlarger. The reason of such effect is that the black-and-white negative image is constituted by fine silver particles dispersed in gelatin and the silver particle scatters the light permeated through the negative. The ratio of the scattered light is raised accompanied with the increasing of the density of the silver image and the size of the silver particle. This effect is called as Callier Effect according to the name of the researcher who studied it.

When parallel incident light is permeated into the negative film in the condenser type enlarger, almost all part of the incident light is progressed to the lens at the low density portion of the negative. Besides, the loss of light is higher at the high density portion than that of the low density portion of the negative. Consequently, the density of the negative is the specular density and the difference of image density at the low density portion and that at the high density portion is made larger. Therefore, the contrast of the printed image is increased.

The image printed by the condenser type enlarger has the highest sharpness. By the condenser type enlarger, a sharp image in which granule of the negative image is clearly observed, and scratches and dusts on the negative tend to be conspicuous.

On the other hand, when diffused incident light is permeated into the negative film in the diffuser type enlarger, a part of the light is progressed to the lens also at the low density portion of the negative. Such ratio is the same as in the high density portion of the negative, and the loss of light at the high density portion is not higher than that at the low density portion. Namely, the light having a certain angle is progress to the lens in the same ratio without the effect of the scatter of the silver particle of the image. As a result of that, the contrast of the image is lower than that of the image formed by the condenser type enlarger.

In the image by the diffuser type enlarger, the sharpness is lower than that of the image formed by the condenser type enlarger and the granule of the image is difficultly conspicuous. The scratches and fine dusts on the negative are also inconspicuous.

In contrast, in the case of the color negative film, the image is constituted by the dye. The ratio of the scattered light by the dye and the difference of the contrast depending on the difference of the type of the light source are almost not. Consequently, almost all of the enlargers for color negative film are the diffuser type using a diffusion box.

The system for printing the image information onto the photographic paper by optical enlargement of the image through an enlarger is above-mentioned, but various light sources are used in the film scanner. In the home-use line scanner, the condenser type light source is usually used, in which a light source having a line spectrum with the same intensity peak at red, green and blue and a low heat generation such as a cathode ray tube and LED, a condenser lens with a low light loss and a high uniformity of luminance are used.

Cool Scan Series manufactured by Nikon Co., Ltd., has been know as the scanner using the LED. In this scanner, Digital Minilab technology disclosed in JP O.P.I. Publication No. 6-28468 is applied, by which the scratches and dusts are detected by infrared light and compensate them by and image processing. Moreover, the light source is made to condenser-diffuser type by the combination of LED and a rod lens in the higher class apparatus of the canner of the series Super Cool Scan 8000ED.

Although a halogen lamp has been usually used as the light source in a scanner for professional use or the scanner part built in a digital printer, a LED light source is used in Frontier 330, manufactured by Fuji. Photo Film Co., Ltd., for erasing the scratches and dusts caused by the parallel light source. The scratches and dusts erasing technology using the infrared image information similar to the forgoing disclosure of JP O.P.I. Publication 6-28468 is described in JP O.P.I. Publication No. 2001-78038.

It has been tried by the inventors to output an image by reading a developed image formed on an imagewise exposed and developed color negative film by various scanners, in which the silver halide, developed silver and colloid silver are incompletely removed. As a result of the investigation, it has been found that an excellent granularity of the image can be obtained when the diffusion coefficient of the light source of the scanner for reading the image is suitably controlled.

The invention of Item 1 is an image forming method using a silver halide color photographic light-sensitive material comprising the steps of imagewise exposing the silver halide color photographic light-sensitive material, color developing the imagewise exposed silver halide color photographic light-sensitive material, and reading the image formed on the silver halide color photographic light-sensitive material in which all or a part of the silver halide, developed silver and if necessary, colloidal silver are remained, by a scanner to obtain an output image, wherein a diffusion coefficient of the light source is not less than 0.08, preferably not less than 0.90, more preferably not less than 0.95, particularly preferably not less than 0.98.

In the silver halide color photographic light-sensitive material from which the silver halide, developed silver and colloidal silver are not removed, not necessary developed silver, silver halide and colloidal silver coexist with useful dyes. When parallel light is used for scanning, the granularity of the image is degraded since the contrast of unnecessary information is raised as above-described. Contrary to that, when the image is read by a scanner having a light source with a diffusion coefficient of not less than 0.08, preferably not less than 0.90, more preferably not less than 0.95, particularly preferably not less than 0.98, the contrast of the unnecessary information is lowered. It is supposed that an image with superior granularity is obtained since the ratio of the information of the dye image is increased according to the decreasing of the contrast of the unnecessary information described as above.

In the invention, the light amount at the film reading portion can be measured by a known method. For example, the light amount can be easily measured by measuring the amount of light through a slit having a know area by an illumination meter such as that of a camera. When a line CCD is used for the measurement, the area of the film actually read by the CCD is calculated and the effective light amount is compensated according to the above calculated value. The light source using a plurality of LED each adjusted to the wavelength of the each of the dyes is applied, the light amount is the sum of the light amounts of light sources for reading the blue-, green- and red-sensitive layers. When the light amount for the reading is varied according to the condition of the film, the light amount means the maximum light amount.

One of the embodiments of the present invention is an image forming method using a silver halide color photographic light-sensitive material comprising the steps of imagewise exposing the silver halide color photographic light-sensitive material, color developing the imagewise exposed silver halide color photographic light-sensitive material, and reading the image formed on the silver halide color photographic light-sensitive material in which all or a part of the silver halide, developed silver and colloidal silver are remained, by a scanner to obtain an output image, wherein an amount of the light at the film reading portion of the scanner is from 50,000 lux to 1,500,000 lux, preferably from 200,000 lux to 1,500,000 lux.

As above-mentioned, it is necessary that the amount of the light at the film reading portion of the scanner is from 50,000 lux to 1,500,000 lux, preferably from 200,000 lux to 1,500,000 lux. The object of the invention can be attained by such condition.

One of the embodiments of the present invention is an image forming method using a silver halide color photographic light-sensitive material comprising the steps of imagewise exposing the silver halide color photographic light-sensitive material, color developing the imagewise exposed silver halide color photographic light-sensitive material, and reading the image formed on the silver halide color photographic light-sensitive material in which all or a part of the silver halide, developed silver and colloidal silver are remained, by a scanner to obtain an output image, wherein a diffusion coefficient of the light source is not less than 0.08, preferably not less than 0.9, more preferably not less than 0.95, particularly preferably not less than 0.98 and an amount of the light at the film reading portion of the scanner is from 50,000 lux to 1,500,000 lux, preferably from 200,000 lux to 1,500,000 lux.

The object of the invention can be more effectively attained by such conditions.

Many unnecessary light-absorbing substances and light-scattering substances are contained in the film from which the silver halide, developed silver and colloidal silver are not removed compared with the film from which they are completely removed. Accordingly, a larger amount of light is necessary to give sufficient amount of light to the CCD through the film containing such light-absorbing and the light-scattering substances. However, an excessively large amount of light given to the film causes blackening the silver halide remained in the film by print-out phenomenon and the granularity of the image is degraded. Accordingly, a suitable light amount range exits as to the light amount for the reading.

One of the embodiments of the present invention is characterized in that the information taking element of the scanner for reading the developed image is a two-dimension CCD.

In the invention, the two-dimension CCD is one constituted by the CCD element having a photo-electric conversion ability arranged in form of at least four lines, and no mechanism for transporting or scanning of the negative film is necessary when such element is applied.

One of the embodiments of the present invention is an image forming method using a silver halide color photographic light-sensitive material comprising the steps of imagewise exposing the silver halide color photographic light-sensitive material, color developing the imagewise exposed silver halide color photographic light-sensitive material, and reading the image formed on the silver halide color photographic light-sensitive material in which all or a part of the silver halide, developed silver and colloidal silver are remained, by a scanner to obtain an output image, wherein the wavelength of the center of gravity of the shape of spectrum of the light for reading the image information of the blue-sensitive layer by the scanner is not shorter than 460 nm, preferably not shorter than 480 nm, more preferably not shorter than 490 nm.

It is preferred that this embodiment of the present invention is combined together with any one of the above-mentioned embodiments of the invention described above.

In the invention, the shape of the spectrum of the light for reading the image by the scanner is a shape of the spectrum of the light entered into the CCD through all the filters arranged between the light source and the image taking element of the CCD, including the filter arranged just before the CCD when a color CCD is used, in the state of that no film is set in the scanner.

The shape of the spectrum of the film is the shape of the spectrum measured under the condition so that the density of the film is made to 1.0 when the film is separately exposed respectively through each of separation filters W-99, W-98 and W-24, manufactured by Kodak Co., Ltd., and processed by usual Processing C-41 and measured by Status M of X-RITE.

In the invention, a wavelength of a center of gravity in the spectrum is obtained according to the following method:

(a) plotting light intensity at the ordinate of the coordinate in terms of antilogarithm and wavelength at the abscissa of the coordinate in terms of antilogarithm to obtain a spectrum;

(b) dividing the spectrum into two, a longer wavelength part and a shorter wavelength part by a line through the wavelength parallel to the ordinate, the area in the shorter wavelength part and the area at the longer wavelength part are the same; and (c) reading the wavelength which divide the spectrum into two equal area. This wavelength is called "a wavelength of a center of gravity in the spectrum".

One of the embodiments of the present invention is an image forming method using a silver halide color photographic light-sensitive material comprising the steps of imagewise exposing the silver halide color photographic light-sensitive material, color developing the imagewise exposed silver halide color photographic light-sensitive material, and reading the image formed on the silver halide color photographic light-sensitive material in which all or a part of the silver halide, developed silver and colloidal silver are remained, by a scanner to obtain an output image, wherein the area ratio of the shape of spectrum of light of the scanner for reading the image information of the blue-sensitive layer overlapping with the shape of the absorption spectrum of the image forming dye of the blue-sensitive layer is not less than 50%.

It is preferred that this embodiment of the present invention is combined together with any one of the above-mentioned embodiments of the invention.

In the invention, the area ratio of the overlapping of the shape of the absorption spectrum of the dye of the blue light-sensitive layer represents the overlapping of the shape of the spectrum which is drawn by plotting the light amount on the horizontal axis and the wavelength on the vertical axis in antilogarithm.

One of the embodiments of the present invention is an image forming method using a silver halide color photographic light-sensitive material comprising the steps of imagewise exposing the silver halide color photographic light-sensitive material, color developing the imagewise exposed silver halide color photographic light-sensitive material, and reading the image formed on the silver halide color photographic light-sensitive material in which all or a part of the silver halide, developed silver and colloidal silver are remained, by a scanner to obtain an output image, wherein the area ratio of the shape of spectrum of light of the scanner for reading the image information of the green-sensitive layer overlapping with the shape of the absorption spectrum of the image forming dye of the green-sensitive layer is not less than 80%.

It is preferred that this embodiment of the present invention is combined together with any one of the above-mentioned embodiments of the invention.

As to the reading of the image information of the green-sensitive layer, the discussion similar to that as to the reading of the image information of the blue-sensitive layer can be applied.

One of the embodiments of the present invention is an image forming method using a silver halide color photographic light-sensitive material comprising the steps of imagewise exposing the silver halide color photographic light-sensitive material, color developing the imagewise exposed silver halide color photographic light-sensitive material, and reading the image formed on the silver halide color photographic light-sensitive material in which all or a part of the silver halide, developed silver and colloidal silver are remained, by a scanner to obtain an output image, wherein the area ratio of the shape of spectrum of light of the scanner for reading the image information of the red light-sensitive layer overlapping with the shape of the absorption spectrum of the image forming dye of the red-sensitive layer is not less than 80%.

It is preferred that this embodiment of the present invention combined together with any one of the above-mentioned embodiments of the present invention.

As to the reading of the image information of the red-sensitive layer, the discussion similar to that as to the reading of the image information of the blue-sensitive layer can be applied.

An optional system such as a system to form the color by the color development of the coupler, a system to form the dye by oxidation of the leuco dye, and a system to form a color image by a silver halide emulsion layer and a color filter layer without color development can be applied to the silver halide photographic light-sensitive material to be used in the invention. The system to form the color by the color development of the coupler is preferably applied. A method of development by applying heat of 45° C. or more is particularly preferred.

The silver halide photographic light-sensitive material preferably has a red-sensitive silver halide emulsion layer, a green-sensitive silver halide emulsion layer and a blue-sensitive silver halide emulsion layer, each capable of recording red-, green- and red light, respectively.

In the invention, the silver halide emulsion described in Research Disclosure No. 308119, hereinafter referred to as RD 308119, can be used.

The portion of the description is shown below:

| Subject | Page in RD 308119 |
|---|---|
| Composition of iodide | 993 I-A |
| Production method | 993 I-A and 994 E |
| Crystal habit, Regular crystal | 993 I-A |
| Crystal habit, Twin crystal | 993 I-A |
| Epitaxial | 993 I-A |
| Uniform halide composition | 993 I-B |
| Non-uniform halide composition | 993 I-B |
| Halide conversion | 994 I-C |
| Halide substitution | 994 I-C |
| Metal containing emulsion | 994 I-D |
| Monodispersion | 995 I-F |
| Solvent addition | 995 I-F |
| Image forming position, Surface | 995 I-G |
| Image forming position, Internal | 995 I-G |
| Light-sensitive material, negative | 995 I-H |
| Positive (including internal fogged grain) | 995 I-H |
| Emulsion mixing | 995 I-I |
| Desalting | 995 II-A |

In the invention, a silver halide emulsion is used which is treated by physical ripening, chemical ripening and spectral sensitizing. The additives to be used in these steps are described in Research Disclosure Nos. 17643, 18716 and 308119, hereinafter referred to as RD 17643, RD 18716 and RD 308119, respectively. The portion of the description is shown below:

| Subject | RD 308119 | RD 17643 | RD 18716 |
|---|---|---|---|
| Chemical sensitizer | 996 III-A | 23 | 648 |
| Spectral sensitizer | 996 IV-A-A, B, C, D, H, I, J | 23–24 | 648–649 |
| Super sensitizer | 996 IV-A-E, J | 23–24 | 648–649 |
| Anti-foggant | 998 VI | 24–25 | 649 |
| Stabilizer | 998 VI | 24–25 | 649 |

Known photographic additives usable in the invention are described in the foregoing Research Disclosure. The portion of the description is shown below:

| Subject | RD 308119 | RD 17643 | RD 18716 |
|---|---|---|---|
| Color contamination preventing agent | 1002 VII-I | 25 | 650 |
| Dye image stabilizer | 1001 VII-J | 25 | |
| Whitening agent | 998 V | 24 | |
| UV absorber | 1003 VIII-I 1003 VIII-C | 25–26 | |
| Light absorbing agent | 1003 VIII | 25–26 | |
| Light scattering agent | 1003 VIII | | |
| Filter dye | 1003 VIII | 25–26 | |
| Binder | 1003 IX | 26 | 651 |
| Anti-static agent | 1006 XIII | 27 | 650 |
| Hardener | 1004 X | 26 | 651 |
| Plasticizer | 1006 XII | 27 | 650 |
| Lubricant | 1006 XII | 27 | 650 |
| Surfactant, Coating aid | 1005 XI | 26–17 | 650 |
| Matting agent | 1007 XVI | | |
| Developing agent in photographic material | 1001 XX-B | | |

Various couplers may be used in the invention. Concrete examples of the coupler are described in the foregoing Research Disclosure. The portion of the description relating to the coupler is shown below.

| Subject | RD 308119 | RD 17643 |
|---|---|---|
| Yellow coupler | 1001 VII-D | VII C-G |
| Magenta coupler | 1001 VII-D | VII C-G |
| Cyan coupler | 1001 VII-D | VII C-G |
| Colored coupler | 1002 VII-G | VII G |
| DIR coupler | 1001 VII-F | VII F |
| BAR coupler | 1002 VII-F | |
| Another effective residue releasing coupler | 1001 VII-F | |
| Alkali-soluble coupler | 1001 VII-E | |

The additives to be used in the invention can be added by the dispersion method described in RD 308119 XIV.

In the invention, a support described in RD 17643, p. 28, RD 18716, p.p. 647–648, and RD 308119 can be used.

An auxiliary layer such as a filter layer and an interlayer described in RD 308119 VII-K can be provided in the light-sensitive material relating to the invention.

The light-sensitive material relating to the invention may have various layer structures such as an ordinary layer order, a reversal layer order and a unit structure.

One of the embodiments of the present invention is an image forming apparatus for reading a developed image in a silver halide color photographic light-sensitive material formed by color developing the imagewise exposed silver halide color photographic light-sensitive material in which all or a part of the silver halide, developed silver and colloidal silver are remained, wherein a diffusion coefficient of the light source is not less than 0.08, preferably not less than 0.9, more preferably not less than 0.95, particularly preferably not less than 0.98, and an amount of the light at the film reading portion of the scanner is from 50.000 lux to 1,500,000 lux, preferably from 200,000 lux to 1,500,000 lux.

This apparatus has the constitution described in the forgoing embodiments.

The invention can be realized by selecting and setting the constitution of the scanner so as to satisfy the requirement of the invention. For example, in the reading apparatus used in the later-mentioned example, the diffusion coefficient of the light source of the can be controlled and set by the use or not use of a condenser lens and controlling of the position thereof, and controlling of the density of an acryl resin plate for light diffusion and the position thereof to the film sample. The light amount may be controlled and set by variation of the voltage to be applied to the light source, not by variation of the diffusion coefficient, so that the light satisfies the foregoing condition.

In the invention, the diffusion coefficient of the light source is defined by the described in Item 2.

The image forming apparatus according to one of the embodiments of the present invention described above is an image forming apparatus for reading a developed image formed on a silver halide color photographic light-sensitive material, which is imagewise exposed to light and developed by a color developing treatment and all or a part of silver halide, developed silver and colloidal silver are remained in the silver halide color photographic light-sensitive material, by a scanner to obtain an output image, wherein the wavelength of the center of gravity of the shape of spectrum of the light for reading the image information of the blue-sensitive layer by the scanner is not shorter than 460 nm, preferably not shorter than 480 nm, more preferably not shorter than 490 nm.

This invention is an apparatus having the constitution described in the forgoing embodiments.

For realization of the invention, the constitution of the scanner is selected and set so as to satisfy the requirements of the invention. For example, in the image reading apparatus used in the later-mentioned example, the center of gravity of wavelength may be controlled and set by varying the property of the filter provided between the light source and the sample to vary the shape of the spectrum of the light for reading the information of the blue light-sensitive layer.

The image forming apparatus according to one of the embodiments of the present invention is an image forming apparatus for reading a developed image formed on a silver halide color photographic light-sensitive material, which is imagewise exposed to light and developed by a color developing treatment and all or a part of silver halide, developed silver and colloidal silver are remained in the silver halide color photographic light-sensitive material, by a scanner to obtain an output image, wherein the shape of the spectrum of the light of the scanner for reading the image information of the blue light-sensitive layer and the and the shape of the absorption spectrum of the image forming dye of the blue light-sensitive layer are overlapped not less than 50% by area ratio.

This invention is an apparatus having the constitution described in the forgoing embodiment.

For realization of the invention, the constitution of the scanner is selected and set so as to satisfy the requirements of the invention. For example, in the image reading apparatus used in the later-mentioned example, the shape of the spectrum may be varied by varying the property of the filter inserted between the light source and the sample so that the overlapping of the shapes of the spectrum each obtained by plotting the light amount on the vertical axis and the wavelength on the horizontal axis by antilogarithm satisfies the forgoing requirements. The diffusion coefficient of the light source is constantly held even when the filer is changed.

The image forming apparatus according to one of the embodiments of the present invention is an image forming apparatus for reading a developed image formed on a silver halide color photographic light-sensitive material, which is imagewise exposed to light and developed by a color developing treatment and all or a part of silver halide, developed silver and colloidal silver are remained in the silver halide color photographic light-sensitive material, by a scanner to obtain an output image, wherein the shape of spectrum of light of the scanner for reading the image information of the green-sensitive layer and the shape of the absorption spectrum of the image forming dye of the green-sensitive layer are overlapped each other not less than 80% by area ratio.

This invention is an apparatus having the constitution described the forgoing embodiment.

As to the reading of the green light-sensitive layer, the scanner may also be controlled and set so as to satisfy the condition according to one of the embodiments of the present invention.

The image forming apparatus according to one of the embodiments of the present invention is an image forming apparatus for reading a developed image formed on a silver halide color photographic light-sensitive material, which is imagewise exposed to light and developed by a color developing treatment and all or a part of silver halide, developed silver and colloidal silver are remained in the silver halide color photographic light-sensitive material, by a scanner to obtain an output image, wherein the shape of spectrum of light of the scanner for reading the image information of the red light-sensitive layer and the shape of the absorption spectrum of the image forming dye of the red-sensitive layer are overlapped not less than 80% by area ratio.

This invention is an apparatus having the constitution described in the forgoing embodiment.

As to the reading of the green light-sensitive layer, the scanner may also be controlled and set so as to satisfy the condition according to the description of one of the embodiments of the present invention.

EXAMPLES

The invention is further concretely described below referring examples; however, the invention is not limited to the embodiments of the examples.

Example 1

Photographing

A Macbeth color chart, a gray standard reflecting plate having a reflectance of 18% and a person were photographed under a suitable exposure condition by Centuria 400 Color Negative Film, produced by Konica Corp., using a single lens reflex camera F4, manufactured by Nikon Co., Ltd.

Development

The foregoing imagewise exposed color negative film was subjected to development according to Color Negative Processing C-41, Eastman Kodak Co., Ltd. Just after the processing, the film was immersed in a 3% solution of acetic acid for 90 seconds and then washed for 300 seconds. Thus a color negative film was obtained which was only treated by the development.

Scanner (Reading Apparatus)

Figure 2:
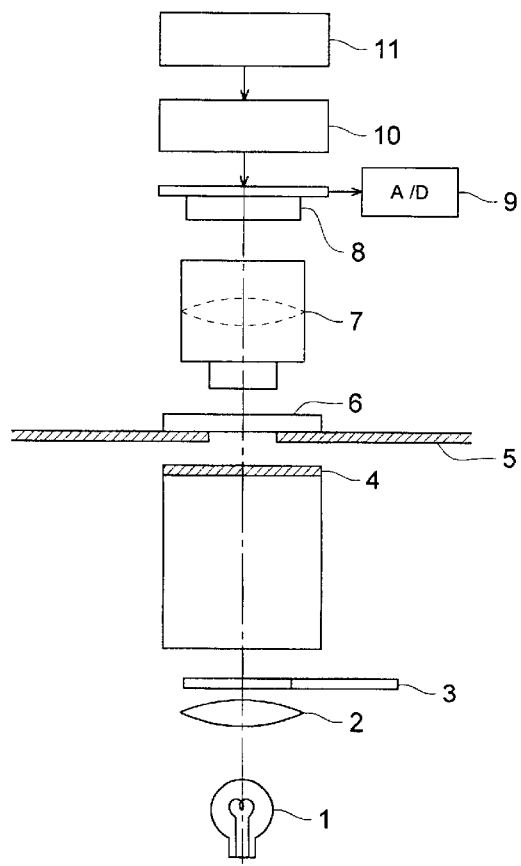
FIG. 2 is a schematic diagram of a scanner of the present invention.

The scanner used in the Example can be described using FIG. 2. Each figure in the parenthesis corresponds to the figure in FIG. 2.

The foregoing film treated only by development process was positioned between a light source constituted by a metal halide lamp light source device (1), manufactured by Hayashi Tokei Co., Ltd., an infrared rays cutting filter HA-30 and C-500, manufactured by Kenko Co., Ltd., a condenser lens (2), a filter turret (3), and an acryl diffusion plate (4) Sumipex, manufactured by Sumitomo Kagaku Co., Ltd., a X-axis micro stage (5) for print adjusting and a two-dimension monochromatic 1024×972 pixel CCD camera (8), manufactured by Electrim Co., Ltd., with a lens having a F value of 2.8 and a focus length of 60 mm (7). The separated image information of each of red, green and blue was read while changing the filter turret and adjusting the print.

(6) is a negative film, (9) is a A/D converter, (10) is a CCD driver and (11) is a scanner controller. Variation of diffusion coefficient, Calculation method The diffusion coefficient was changed as shown in Table 1 by the use or not use of the condenser lens and the variation of the position thereof and the density of the diffusion acryl plate and the position thereof to the film sample for reading the images of Samples 101 to 108.

The calculation method of a diffusion coefficient can be described using FIG. 1. Each figure in the parenthesis corresponds to the figure in FIG. 1.

To determine the diffusion coefficient of the light, an aperture (5) having the same size as that of the 35 mm format was set at the position (4) at which the sample to be set and the illuminance at this position ($S_0$) and the illuminance at a distance of 10 cm from the film position ($S_1$) was measured by Color Meter IIIF (6), manufactured by Minolta Co., Ltd.

(1) a light source and (2) is a condenser lens.

Variation of Light Amount

The light amount was controlled by a controller attached with the metal halide lamp light source apparatus, manufactured by Hayashi Tokei Co., Ltd., so that the light amount was constantly held at 50,000 Lux, while holding the diffusion coefficient at a constant.

Processing and Output of Image

The image was subjected to a processing such as a negative-positive reversing processing, a gradation control for adjustment to the property of the output apparatus or the eyesight, and emphasis of chroma for recovering the degradation of color reproducibility caused by the presence of unnecessary light absorbing substance. Thus an output image suitable for CRT display was obtained. The obtained image was output as an A4 size color print by Distal Minicab QD-21, manufactured by Konica Corp.

The graininess of each of the images was evaluated by 10-point system by randomly selected nonprofessional 50 observers comparing Image 101 of which graininess was set as point of 5. The larger evaluation point was corresponding to a higher quality of the image.

Results of the evaluation are shown in Table 1.

In each of Samples 103 through 106 according to the invention, the influence of Callier effect due to the developed silver was small and the resultant images have a favorable graininess.

TABLE 1

| Sample No. | Diffusion coefficient | Graininess | Remarks |
|---|---|---|---|
| 101 | 0.6 | 5 | Comparative |
| 102 | 0.7 | 5.1 | Comparative |
| 103 | 0.85 | 6.7 | Inventive |
| 104 | 0.92 | 7.7 | Inventive |
| 105 | 0.96 | 8.5 | Inventive |
| 106 | 0.99 | 9.8 | Inventive |

Example 2

Samples were prepared in the same manner as in Example 1 except the diffusion coefficient of the light source was fixed at 0.83 and the light amount was varied.

The light amount 300,000 Lux or more was obtained by the use of plural of the light source the same as that used in Example 1 and the light beams irradiated from the light sources were verlapped by a mirror.

The graininess and the color reproducibility of the samples were evaluated in the same manner as in Example 1 except that the point of the image of Sample 201 was set at 5.

Thus obtained results are shown in Table 2.

TABLE 2

| Sample No. | Light amount (×10,000 Lux) | Graininess | Color reproducibility | Remarks |
|---|---|---|---|---|
| 201 | 2 | 5 | 5 | Comparative |
| 202 | 4 | 5.1 | 4.9 | Comparative |
| 203 | 7 | 6.6 | 5.1 | Inventive |
| 204 | 30 | 7.9 | 5.2 | Inventive |
| 205 | 100 | 8.2 | 5.1 | Inventive |
| 206 | 180 | 8.1 | 3.1 | Comparative |

In each of Samples 203 through 205, the image excellent in the graininess and the color reproducibility can be obtained. In Sample 206, the degradation of the color reproducibility was caused by the formation of printout silver since the light amount was excessively large.

Example 3

Developed samples were prepared in the same manner as in the above except that a strobe-flash lump was used as the light source for photographing. The images were made in the same manner as in Examples 1 and 2 except that the image reading was performed while changing both of the diffusion coefficient of light source and the light amount.

The graininess, the color reproducibility and the latitude of thus obtained mages were evaluated in the same manner as above except that the image of No. 301 was used as the standard. In each of the images, the highlight part around the nose of the portrait image tends to be burned-out since the image was photographed with a strobe-flash light. Accordingly the evaluation of the latitude was principally preformed as to the reproducibility of this part of the image. The latitude was relatively evaluated when that of the image of Sample 301 was as 5.0.

Thus obtained results are shown in Table 3.

TABLE 3

| Sample No. | Diffusion coefficient | Light amount (×10.000 Lux) | Graininess | Color reproducibility | Latitude | Remarks |
|---|---|---|---|---|---|---|
| 301 | 0.78 | 3 | 5 | 5.0 | 5.0 | Comp. |
| 302 | 0.78 | 6 | 5.1 | 4.9 | 4.9 | Comp. |
| 303 | 0.78 | 9 | 5.2 | 4.9 | 5.1 | Comp. |
| 304 | 0.78 | 30 | 5.2 | 5.1 | 4.8 | Comp. |
| 305 | 0.78 | 170 | 5.2 | 5.2 | 4.8 | Comp. |
| 306 | 0.85 | 3 | 6.5 | 5.0 | 5.0 | Comp. |
| 307 | 0.85 | 6 | 6.8 | 4.9 | 4.9 | Comp. |
| 308 | 0.85 | 9 | 7.7 | 5.1 | 5.1 | Comp. |
| 309 | 0.85 | 30 | 8.1 | 5.0 | 5.2 | Comp. |
| 310 | 0.85 | 170 | 8.1 | 2.9 | 4.9 | Comp. |
| 311 | 0.92 | 3 | 6.8 | 5.0 | 5.0 | Comp. |
| 312 | 0.92 | 6 | 7.7 | 4.9 | 4.8 | Comp. |
| 313 | 0.92 | 9 | 8.1 | 5.1 | 7.2 | Inv. |
| 314 | 0.92 | 30 | 8.6 | 4.8 | 7.9 | Inv. |
| 315 | 0.92 | 170 | 8.6 | 2.9 | 5.2 | Comp. |
| 316 | 0.96 | 3 | 8.6 | 5.2 | 4.9 | Comp. |
| 317 | 0.96 | 6 | 9 | 4.9 | 4.9 | Comp. |
| 318 | 0.96 | 9 | 9.1 | 5.1 | 7.7 | Inv. |
| 319 | 0.96 | 30 | 9.2 | 4.9 | 8.5 | Inv. |
| 320 | 0.96 | 170 | 9.2 | 2.8 | 5.3 | Comp. |
| 321 | 0.99 | 3 | 9.7 | 5.1 | 5.0 | Comp. |
| 322 | 0.99 | 6 | 9.8 | 5.1 | 5.1 | Comp. |
| 323 | 0.99 | 9 | 9.8 | 4.9 | 8.3 | Inv. |
| 324 | 0.99 | 30 | 9.9 | 5.0 | 9.2 | Inv. |
| 325 | 0.99 | 170 | 9.9 | 2.8 | 5.4 | Comp. |

Comp.: Comparative
Inv.: Inventive

The observers each gave high points to the samples according to the invention since the images of such samples each showed apparently an expanded latitude while holding a good graininess and a high color reproducibility.

Example 4

Images were each output in the same manner as in Example 1 except that the spectrum of the light for reading the information of the blue light-sensitive layer is changed as follows by changing the property of the filter arranged between the light source and the sample. The reading conditions for the green light-sensitive layer and red light-sensitive layer were not changed. The obtained images were evaluated in the same manner as in Example 1 except that Sample 401 was used as the standard of point 5.

Thus obtained results are shown in Table 4.

TABLE 4

| Sample No. | Wavelength of center of gravity of blue (nm) | Graininess | Remarks |
|---|---|---|---|
| 401 | 455 | 5 | Comparative |
| 402 | 465 | 6.5 | Inventive |
| 403 | 475 | 7.6 | Inventive |
| 404 | 484 | 8.2 | Inventive |
| 405 | 495 | 8.6 | Inventive |

It is understood that the samples according to the invention have suitable graininess. The largest problem of the sample without bleaching and fixing is the absorption by the inherent absorption of the silver halide and that of the yellow absorption layer even though various factors are considered. The racking of the image information caused by such absorption can be avoided by image formation according to the invention so that the image with a high S/N ratio and a high evaluation point of graininess can be obtained.

Example 5

The images were each read in the same manner as in Example 1 except that the shape of spectrum was changed by varying the property of the filter inserted between the light source and the sample. The diffusion coefficient of the light source is held at a constant since the filter was only changed; the light amount was controlled so as to be constant.

The color reproducibility of the images of the Macbeth chart prepared in the same manner as in Example 1 was evaluated by 40 observers.

Thus obtained results are shown in Table 5. It is understood that the samples according to the invention are excellent in the color reproducibility.

TABLE 5

| Sample No. | Overlapping ratio in blue region (%) | Overlapping ratio in green region (%) | Overlapping ratio in red region (%) | Color reproducibility | Remarks |
|---|---|---|---|---|---|
| 501 | 30 | 75 | 75 | 5 | Comp. |
| 502 | 45 | 75 | 75 | 5.2 | Comp. |
| 503 | 55 | 75 | 75 | 6.3 | Inv. |
| 504 | 45 | 60 | 75 | 5.1 | Comp. |
| 505 | 45 | 85 | 75 | 8.3 | Inv. |
| 506 | 45 | 75 | 60 | 4.9 | Comp. |
| 507 | 45 | 75 | 85 | 8.1 | Inv. |
| 508 | 55 | 85 | 75 | 9.1 | Inv. |
| 509 | 55 | 75 | 85 | 9 | Inv. |
| 510 | 45 | 85 | 85 | 9.3 | Inv. |
| 511 | 55 | 85 | 85 | 9.7 | Inv. |

Comp.: Comparative,
Inv.: Inventive

In a usual scanner, a wide spectral sensitive characteristic is preferred as far as the spectrum is not overlapped with the absorption of the color forming dyer of the layer other than that to be read to obtain the large amount of the transmitted light. However, the absorption of silver exists additionally to that of the color forming dye. The absorption of silver has little dependence on the wavelength of the light. Accordingly, the information regarding the remained developed silver is relatively increased when the spectral sensitive property is made excessively wide. Such situation is not preferred since the increasing of the information regarding the developed silver is harmful the to image formation. Excellent color reproducibility can be obtained in the samples according to the invention because such problem is dissolved.

The image forming method by the simplified processing of the silver halide color photographic light-sensitive material giving the image almost the equal to that by the usual processing and the apparatus for realizing such method can be provided by the invention.

What is claimed is:

1. An image information recording method, comprising the steps of:
    (a) imagewise exposing to light a silver halide color photographic light-sensitive material comprising a support having thereon a light-sensitive layer containing a silver halide and a color coupler;
    (b) subjecting the photographic light-sensitive material to color development so as to obtain an image in the photographic light-sensitive material;
    (c) converting the image in the photographic light-sensitive material to electric image information using a scanner comprising a light source part and a light receiving part while at least 80% of the developed silver and the silver halide remains in the photographic light-sensitive material; and
    (d) recording the electric information on a recording medium;
    wherein, the step (c) is carried out with the scanner that exhibits a light diffusion coefficient of at least 0.9, wherein the step (c) is carried out with the scanner by adjusting an illuminance the light receiving part to be in a range of 80,000 to 1,500,000 lux.

2. The image information recording method of claim 1, wherein the light receiving part comprises a two-dimensional CCD.

3. The image information recording method of claim 1, wherein the light-sensitive layer comprises a blue sensitive layer, a green sensitive layer and a red sensitive layer, and the light source part of the scanner for reading image information of the blue sensitive layer remits light having a spectrum exhibiting a wavelength of a center of gravity in the spectrum being longer than 460 nm, wherein the center of gravity in the spectrum, which is obtained plotting light intensity at the ordinate or the coordinate in terms of antilogarithm and wavelength at the abscissa of the coordinate in terms of antilogarithm, is a wavelength such that when the spectrum is divided into two, a longer wavelength part and a shorter wavelength part by a line through the wavelength parallel to the ordinate, the area in the shorter wavelength part and the area at the longer wavelength part are the same.

4. The image information recording method of claim 3, wherein the overlapped area of the spectrum of the light source part for reading image information of the blue sensitive layer and the absorption spectrum of the image forming dye of the blue sensitive layer is at least 50% of the total area of the absorption spectrum of the image forming dye.

5. The image information recording method of claim 3, wherein the overlapped area of the spectrum of the light source part for reading image information of the green sensitive layer and the absorption spectrum of the image forming dye of the green sensitive layer is at least 80% of the total area of the absorption spectrum of the image forming dye.

6. The image information recording method of claim 3, wherein the overlapped area of the spectrum of the light source part for reading image information of the red sensitive layer and the absorption spectrum of the image forming dye of the red sensitive layer is at least 80% of the total area of the absorption spectrum of the image forming dye.

7. The image information recording method of claim 1, wherein the step (c) is carried out with the scanner that exhibits a light diffusion coefficient of 0.92 or higher.

* * * * *